United States Patent [19]

Matzinger

[11] Patent Number: 4,619,991
[45] Date of Patent: Oct. 28, 1986

[54] PROCESS FOR THE PRODUCTION OF AZO COMPOUNDS

[75] Inventor: Peter Matzinger, Zürich, Switzerland

[73] Assignee: Sandoz Ltd., Basel, Switzerland

[21] Appl. No.: 409,300

[22] Filed: Aug. 18, 1982

Related U.S. Application Data

[63] Continuation of Ser. No. 305,608, Sep. 25, 1981, abandoned, which is a continuation of Ser. No. 120,137, Feb. 11, 1980, abandoned.

[51] Int. Cl.$^4$ .................... C09B 29/036; C09B 43/00
[52] U.S. Cl. ............................. 534/588; 534/599; 534/733; 534/753; 534/794; 534/791; 548/255
[58] Field of Search .................. 260/157; 548/255; 534/588, 599, 733, 753, 791, 794

[56] References Cited

PUBLICATIONS

Theilheimer, *Synthetic Methods of Organic Chemistry*, vol. 18, S. Karger, Basle (1964), p. 70.
Theilheimer, *Synthetic Methods of Organic Chemistry*, vol. 19, S. Karger, Basle (1965), p. 238.
Theilheimer, *Synthetic Methods of Organic Chemistry*, vol. 25, S. Karger, Basle (1971), p. 273.

*Primary Examiner*—Floyd D. Higel
*Attorney, Agent, or Firm*—Gerald D. Sharkin; Richard E. Vila; Melvyn M. Kassenoff

[57] ABSTRACT

Process for the production of triazoles of the formula

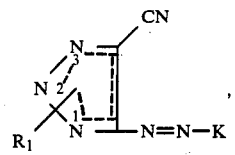

in which
$R_1$ is hydrogen or an aliphatic or aromatic substituent conventional for diazo components of disperse dyes, which substituent is bound to the N-atom in the 1- or 2-position of the triazole nucleus through a carbon atom, and
K is a coupling component radical
comprising treating a compound of the formula

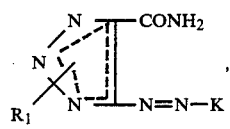

with a dehydrating agent.

20 Claims, No Drawings

PROCESS FOR THE PRODUCTION OF AZO COMPOUNDS

This application is a continuation of application Ser. No. 305,608, filed Sept. 25, 1981 and now abandoned, which is a continuation of application Ser. No. 120,137, filed Feb. 11, 1980 and now abandoned.

The present invention relates to a process for the production of azo compounds, more particularly to the production of triazoles.

Accordingly, the present invention provides a process for the production of compounds of formula I,

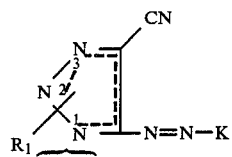

in which

R₁ is hydrogen or an aliphatic or aromatic substituent conventional for diazo components of disperse dyes, which substituent is bound to the N-atom in the 1- or 2-position of the triazole nucleus through a carbon atom, and K is a coupling component radical comprising treating a compound of formula II,

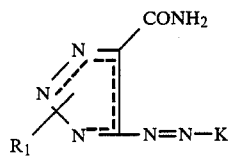

with a dehydrating agent.

Suitable dehydrating agents include inorganic acid halides, for example phosphorus oxyhalides, phosphorus tri- and penta-halides and thionyl chloride, dehydrating acids, for example polyphosphoric acid, sulphuric acid, paratoluenesulphonic acid, acid anhydrides and chlorosulphonyl isocyanate. The most preferred dehydrating agent is phosphorus oxychloride.

Dehydration is effected in accordance with known methods, e.g. in an inert organic solvent. Suitable inert organic solvents are those in which the compounds of formula II are at least partially soluble, for example dialkylformamides, particularly dimethylformamide. The preferred reaction temperatures are between 20° to 100° C., more preferably between 40° and 60° C. The reaction time will vary depending on the reaction temperature. In general, the reaction takes place in ½ hour or less when the reaction is conducted at temperatures above 40° C. When a temperature of 40° C. and under is employed the reaction may take slightly longer, for example up to 1 hour. Completion of the dehydration reaction can be ascertained by conventional techniques, for example by thin layer chromatography. Precipitation of the reaction product is preferably effected by the addition of water and/or alcohol and isolation is effected in accordance with known methods, for example by filtration and washing.

The diazo components of the compounds of formula II are either known [J. R. E. Hoover et al., J. Am. Chem. Soc. 78,5832 (1956)] or may be prepared in analogous manner from available starting materials.

Diazotization and coupling are carried out in accordance with known methods.

Preferred compounds of formula II are those where the group R₁ is attached to the N-atom in the 1-position.

The double bonds of the triazole ring are in the 2,3- and 4,5-positions when R₁ is in the 1-position and in the 3,4- and 1,5-position when R₁ is in the 2-position.

Preferred aliphatic or aromatic substituents for R₁ are those of the alkyl, alkenyl or benzene series.

Preferred significances for R₁ are hydrogen; $C_{1-4}$alkyl; $C_{1-4}$alkyl monosubstituted by fluorine, chlorine, bromine, alkylcarbonyl, alkoxy, cyano, thiocyano, phenoxy, alkoxycarbonyl, phenoxycarbonyl, alkoxyethoxycarbonyl, alkylaminocarbonyl, dialkylaminocarbonyl, phenylaminocarbonyl, N-alkyl-N-phenylaminocarbonyl, benzoyl, alkylcarbonyloxy, phenylsulphonyl, alkylsulphonyl, aminosulphonyl, alkylaminosulphonyl, dialkylaminosulphonyl, phenylaminosulphonyl, N-alkyl-N-phenylaminosulphonyl, or phenyl which is unsubstituted or substituted by up to two substituents independently selected from chlorine, bromine, nitro, cyano, trifluoromethyl, alkyl and alkoxy; alkenyl or alkenyl monosubstituted by chlorine, bromine or phenyl; alkynyl; phenyl or phenyl substituted by a total of up to three substituents selected from alkyl, alkoxy, chlorine, bromine, nitro (up to three of each of these), cyano, trifluoromethyl, alkoxycarbonyl (up to two of each of these), formyl, alkylcarbonyl, alkylaminocarbonyl, dialkylaminocarbonyl, alkylsulphonyl, phenylsulphonyl, aminosulphonyl, alkylaminosulphonyl, dialkylaminosulphonyl, and phenylaminosulphonyl (up to one of each of these), wherein any alkyl or alkoxy moiety as R₁ or contained therein contains up to 4, preferably up to 2, carbon atoms and any alkenyl or alkynyl group contains from 2 to 4, preferably 3 or 4, carbon atoms.

Any alkyl, alkenyl or alkynyl groups as R₁ are straight-chain or branched.

More preferably R₁ is hydrogen; $C_{1-2}$alkyl; $C_{1-2}$alkyl monosubstituted by chlorine, phenyl, mono- or dichlorophenyl, cyano, acetoxy, benzoyl or alkyl($C_{1-2}$alkyl)-carbonyl; allyl; 3-chloroallyl; 3-phenylallyl; phenyl; chlorophenyl or tolyl.

Most preferably R₁ is phenyl, chlorophenyl, benzyl, chlorobenzyl dichlorobenzyl or tolyl, with benzyl and mono- or dichlorobenzyl being especially preferred.

Preferably the process of the present invention is used to produce disperse dyestuffs having coupling component radicals of the 1,4-phenylene series in particular dyestuffs of formula III

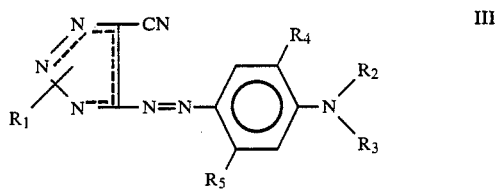

in which
R₁ is as defined above
each of
R₂ and R₃, independently, is hydrogen; $C_{1-8}$alkyl; $C_{1-8}$alkyl monosubstituted by chlorine, bromine, cyano, thiocyano, alkylcarbonyl, alkoxycarbonyl, formyloxy, alkylcarbonyloxy, chloro- or bromoalkyl-carbonyloxy, alkoxycarbonyloxy, alkoxyalkoxycarbonyl, allyloxycarbonyl, chloro- or bromoallyloxycarbonyl, alkenyloxy, chloro- or bromoalkenyloxy, alkynyloxy, benzoyloxy, alkoxy, phenyl, phenoxy, phenylalkoxy, alkyl- or dialkylaminocarbonyl, alkyl- or dialkylaminocarbonyloxy, phenylaminocarbonyl, phenylaminocarbonyloxy, phthalimidyl, saccharinyl-2, pyridyl or benzothiazolyl-2-mercapto; alkoxyalkyl in which the alkoxy is monosubstituted by chlorine, bromine, cyano, alkoxy, alkoxycarbonyl, alkoxycarbonyloxy or alkylcarbonyloxy; 2-alkylcarbonyloxy 3-propynyloxy- or allyloxy-propyl; alkenyl or alkenyl monosubstituted by phenyl, chlorine or bromine; alkynyl; $C_{5-7}$cycloalkyl (preferably cyclohexyl) or $C_{5-7}$cycloalkyl (preferably cyclohexyl) substituted by up to three methyl groups; or phenyl or phenyl substituted by up to three substituents independently selected from chlorine, bromine, methyl and $C_{1-2}$alkoxy, with the proviso that at least one of $R_2$ and $R_3$ is other than cycloalkyl, substituted cycloalkyl, phenyl or substituted phenyl and when $R_2$ is hydrogen, $R_3$ is other than hydrogen. The alkyl groups and alkoxy groups in substituents as $R_2$ and/or $R_3$ contain, unless otherwise stated, up to 4, preferably up to 2, carbon atoms, and the alkenyl and alkynyl groups 2 to 4, preferably 3 or 4, carbon atoms, such alkyl, alkenyl and alkynyl groups being straight-chain or branched, $R_4$ is hydrogen, chlorine, bromine, $C_{1-2}$alkyl, $C_{1-2}$alkoxy or phenoxy, and $R_5$ is hydrogen; $C_{1-2}$alkyl; $C_{1-2}$alkoxy; cyano; formylamino; alkylcarbonylamino in which the alkyl group is unsubstituted or monosubstituted by chlorine, bromine, alkoxy, phenyl or phenoxy; benzoylmino; alkenylcarbonylamino; aminocarbonylamino; alkylaminocarbonylamino; alkoxycarbonylamino in which the alkoxy group is unsubstituted or monosubstituted by alkoxy or phenyl; $C_{1-2}$alkyl sulphonylamino; di($C_{1-2}$alkyl)aminosulphonylamino; chlorine; bromine or phenoxy, with the proviso that when $R_4$ is chlorine, bromine or phenoxy, $R_5$ is other than chlorine, bromine or phenoxy, the alkyl and alkoxy moieties in substituents as $R_5$ unless otherwise stated contain up to 4, preferably up to 2, carbon atoms and the alkenyl moieties contain 2 to 4, preferably 2 or 3, carbon atoms, the alkyl and alkenyl moieties being straight-chain or branched,
especially those compounds of formula III where $R_1$ is in the 1-position.

Most preferably each of $R_2$ and $R_3$ independently is acetoxyethyl, allyloxyethyl, prop-2-ynyloxyethyl, 2-acetoxypropyl, allyl, 2-methylallyl or benzyloxyethyl.

The process of the present invention has the advantage that 4-cyano-1,2,3-triazole azo compounds can be obtained in greater yields than when a 5-amino-4-cyano-1,2,3,triazole is diazotized and coupled with a coupling component. The same improvement is not obtained with similar ortho cyano-substituted heterocyclic diazo compounds, e.g. pyrazoles.

The disperse dye products of the process of the present invention are useful for dyeing high-molecular weight, hydrophobic, synthetic or semi-synthetic organic textile substrates, in particular polyesters as disclosed in application Ser. No. 2,085, filed Jan. 9, 1979 and now U.S. Pat. No. 4,341,700.

The following examples further serve to illustrate the invention. In the examples all parts are by weight and temperatures are in degrees Centigrade.

EXAMPLE 1

22 Parts 5-amino-1-benzyl-4-carboxamido-1,2,3-triazole are dissolved in 170 parts ortho-phosphoric acid. After cooling to $-5°$, 35 parts nitrosylsulphuric acid are added dropwise and the mixture is stirred at this temperature for 3 hours. The diazonium salt solution is added dropwise to a solution of 34 parts 1-propionylamino-3-di(N-B-acetoxyethyl)-amino-benzene in 200 parts methanol and 100 parts water at $-5°$ and subsequently stirred for 2 hours at $0°$. The reaction mixture is then poured onto a mixture of 300 parts ice and 200 parts water whereupon the dyestuff precipitates. After filtering, washing free of acid and salt with water and drying, 51 parts of an orange-coloured compound of the formula

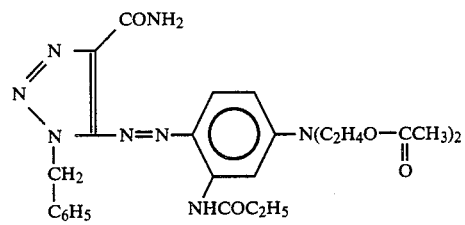

is obtained. This compound is dissolved in 200 parts dimethylformamide. At room temperature 25 parts phosphorusoxychloride are added slowly thereto and the mixture is heated to $45°$. After ½ hour, 75 parts ice water are added and the mixture is stirred for 1 hour. The precipitated dyestuff is filtered, washed neutral with water and dried.

33 Parts (60% yield) of the dyestuff of the

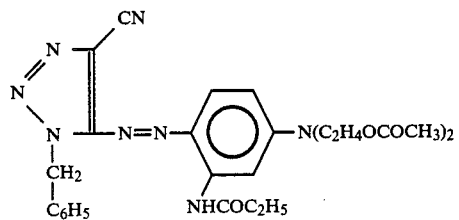

is obtained which dyes polyester in brilliant red shades with good fastness. When the same dyestuff is made by diazotizing 5-amino-1-benzyl-4-cyano-1,2,3-triazole and coupling the product with 1-propionylamino-3-N,N-di-(β-acetoxyethyl)aminobenzene, the yield is only 40%.

Further dyestuffs which can be made in accordance with the process of the present invention in approximately the same yields as that of the product of Example 1 are given in the following Table. Furthermore, the dye shade on polyester of the dyestuffs obtained is also indicated.

TABLE

| EX. No. | $R_1$ | $R_2$ | $R_3$ |
| --- | --- | --- | --- |
| 2 | —$CH_2C_6H_5$ | —$CH_2CH_2OCH_2CH=CH_2$ | —$CH_2CH_2OCH_2CH=CH_2$ |

TABLE-continued

| | | | |
|---|---|---|---|
| 3 | −CH$_2$−⌬(Cl)(Cl) | " | −CH$_2$CH$_2$OCH$_2$C$_6$H$_5$ |
| 4 | −C$_6$H$_5$ | −CH$_2$CH$_2$CN | −CH$_2$CH$_2$OCOCH$_3$ |
| 5 | " | −CH$_2$CH$_2$OCOCH$_3$ | " |
| 6 | −CH$_2$C$_6$H$_5$ | −CH$_2$CH$_2$CN | " |
| 7 | −⌬−CH$_3$ | −CH$_2$CH═CHCl | −CH$_2$CH═CHCl |
| 8 | −CH$_2$C$_6$H$_5$ | −CH$_2$CH$_2$OCH$_2$CH═CH$_2$ | −C$_6$H$_5$ |
| 9 | " | −CH$_2$CH$_2$OCH$_2$C≡CH | " |
| 10 | " | −CH$_2$CH$_2$OCOOCH$_3$ | |
| 11 | " | −CH$_2$CH$_2$OCOC$_2$H$_5$ | −CH$_2$CH$_2$OCOC$_2$H$_5$ |
| 12 | " | −CH$_2$CH$_2$OCH$_2$CH═CHCl | −CH$_2$CH$_2$OCH$_2$CH═CHCl |
| 13 | " | −CH$_2$CH$_2$OCOCH$_3$ | −CH$_2$CH$_2$OCOCH$_3$ |
| 14 | " | −CH$_2$CH═CH$_2$ | −CH$_2$CH═CH$_2$ |

| EX. No. | R$_4$ | R$_5$ | Shade on polyester fibre material |
|---|---|---|---|
| 2 | H | −NHCOCH$_3$ | red |
| 3 | H | " | " |
| 4 | H | " | " |
| 5 | −OC$_2$H$_5$ | " | violet |
| 6 | H | H | orange |
| 7 | H | −NHCOCH$_3$ | red |
| 8 | H | −NHCOOC$_2$H$_5$ | " |
| 9 | H | −CH$_3$ | " |
| 10 | H | −NHCOCH$_3$ | " |
| 11 | H | −NHSO$_2$CH$_3$ | " |
| 12 | H | −NHCOOCH$_2$CH$_2$OCH$_3$ | " |
| 13 | H | −NHCOCH$_3$ | " |
| 14 | H | " | " |

What is claimed is:

1. A process for the synthesis of a compound of the formula

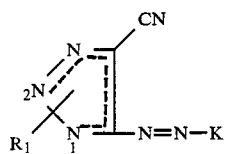

comprising treating a compound of the formula

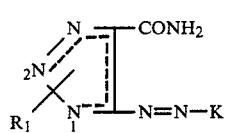

with a dehydrating agent to obtain a compound of the formula

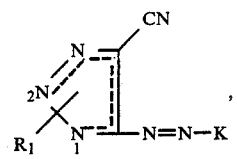

said dehydrating agent being an agent capable of dehydrating a compound of the formula

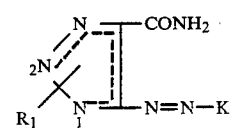

to a compound of the formula

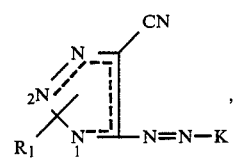

wherein $R_1$ is hydrogen; $C_{1-4}$alkyl; $C_{1-4}$alkyl monosubstituted by fluoro, chloro, bromo, ($C_{1-4}$alkyl)carbonyl, $C_{1-4}$alkoxy, cyano, thiocyano, phenoxy, ($C_{1-4}$alkoxy)carbonyl, phenoxycarbonyl, ($C_{1-4}$alkoxy)ethoxycarbonyl, ($C_{1-4}$alkyl)carbamoyl, di-($C_{1-4}$alkyl)carbamoyl, phenylcarbamoyl, N-$C_{1-4}$alkyl-N-phenylcarbamoyl, benzoyl, ($C_{1-4}$alkyl)carbonyloxy, phenylsulfonyl, $C_{1-4}$alkylsulfonyl, sulfamoyl, $C_{1-4}$alkylsulfamoyl, di-($C_{1-4}$alkyl)sulfamoyl, phenylsulfamoyl, N-$C_{1-4}$alkyl-N-phenylsulfamoyl, phenyl or substituted phenyl having 1 or 2 substituents each of which is independently chloro, bromo, nitro, cyano, trifluoromethyl, $C_{1-4}$alkyl or $C_{1-4}$alkoxy; $C_{2-4}$alkenyl; $C_{2-4}$alkenyl monosubstituted by chloro, bromo or phenyl; $C_{2-4}$alkynyl; phenyl or substituted phenyl having 1 to 3 substituents each of which is independently $C_{1-4}$alkyl, $C_{1-4}$alkoxy, chloro, bromo, nitro, cyano (maximum of two), trifluoromethyl (maximum of two), ($C_{1-4}$alkoxy)carbonyl (maximum of two), formyl (maximum of one), ($C_{1-4}$-alkyl)carbonyl (maximum of one), ($C_{1-4}$alkyl)carbamoyl (maximum of one), di-($C_{1-4}$alkyl)carbamoyl (maximum of one), $C_{1-4}$alkylsulfonyl (maximum of one), phenylsulfonyl (maximum of one), sulfamoyl (maximum of one), $C_{1-4}$-alkylsulfamoyl (maximum of one), di-($C_{1-4}$alkyl)sulfamoyl (maximum of one) or phenylsulfamoyl (maximum of one), with the proviso that $R_1$ is in the 1-position of the triazole ring and the broken line represents double bonds in the 2,3- and 4,5-positions or $R_1$ is in the 2-position of the triazole ring and the broken line represents double bonds in the 3,4- and 1,5-positions, and K is a coupling component radical.

2. A process according to claim 1 wherein said dehydrating agent is an inorganic acid halide, a dehydrating acid or an acid anhydride.

3. A process according to claim 2 wherein said dehydrating agent is phosphorus oxychloride.

4. A process according to claim 1 wherein the reaction is conducted at a temperature of 20°–100° C.

5. A process according to claim 4 wherein the reaction is conducted at a temperature of 40°–60° C.

6. A process according to claim 1 wherein $R_1$ is the 1-position of the triazole ring and the broken line represents double bonds in the 2,3- and 4,5-positions.

7. A process according to claim 1 comprising treating a compound of the formula

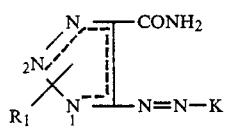

with a dehydrating agent selected from the group consisting of an inorganic acid halide, a dehydrating acid and an acid anhydride in an inert organic solvent in which said compound is at least partially soluble and at a temperature of 20°–100° C.

8. A process according to claim 7 wherein said dehydrating agent is phosphorus oxychloride.

9. A process according to claim 1

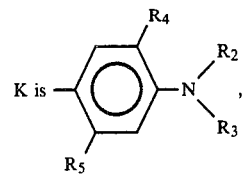

wherein
each of $R_2$ and $R_3$ is independently hydrogen; $C_{1-8}$alkyl; $C_{1-8}$alkyl monosubstituted by chloro, bromo, cyano, thiocyano, ($C_{1-4}$-alkyl)carbonyl, ($C_{1-4}$alkoxy)carbonyl, formyloxy, ($C_{1-4}$alkyl)carbonyloxy, ($C_{1-4}$chloroalkyl)carbonyloxy, ($C_{1-4}$-bromoalkyl)carbonyloxy, ($C_{1-4}$alkoxy)carbonyloxy, ($C_{1-4}$alkoxy)($C_{1-4}$alkoxy)carbonyl, allyloxycarbonyl, chloroallyloxycarbonyl, bromoallyloxycarbonyl, $C_{2-4}$alkenyloxy, $C_{2-4}$chloroalkenyloxy, $C_{2-4}$bromoalkenyloxy, $C_{2-4}$alkynyloxy, benzoyloxy, $C_{1-4}$alkoxy, phenyl, phenoxy, phenyl($C_{1-4}$alkoxy), ($C_{1-4}$alkyl)carbamoyl, di-($C_{1-4}$alkyl)carbamoyl, ($C_{1-4}$alkyl)carbamoyloxy, di-($C_{1-4}$alkyl)carbamoyloxy, phenylcarbamoyl, phenylcarbamoyloxy, phthalimidyl, saccharinyl-2, pyridyl or benzothiazolyl-2-mercapto; ($C_{1-4}$alkoxy)$C_{1-4}$alkyl the $C_{1-4}$alkoxy moiety of which is monosubstituted by chloro, bromo, cyano, $C_{1-4}$alkoxy, ($C_{1-4}$alkoxy)carbonyl, ($C_{1-4}$alkoxy)carbonyloxy or ($C_{1-4}$alkyl)carbonyloxy; 2-($C_{1-4}$alkyl)carbonyloxy-3-propynyloxypropyl; 2-($C_{1-4}$alkyl)carbonyloxy-3-allyloxypropyl; $C_{2-4}$alkenyl; $C_{2-4}$alkenyl monosubstituted by phenyl, chloro or bromo; $C_{2-4}$alkynyl; $C_{5-7}$cycloalkyl; $C_{5-7}$cycloalkyl substituted by 1 to 3 methyl groups; phenyl or substituted phenyl having 1 to 3 substituents each of which is independently chloro, bromo, methyl or $C_{1-2}$alkoxy, with the provisos that at least one of $R_2$ and $R_3$ is other than $C_{5-7}$cycloalkyl, $C_{5-7}$cycloalkyl substituted by 1 to 3 methyl groups, phenyl or substituted phenyl and that at least one of $R_2$ and $R_3$ is other than hydrogen, $R_4$ is hydrogen, chloro, bromo, $C_{1-2}$alkyl, $C_{1-2}$alkoxy or phenoxy, and $R_5$ is hydrogen; $C_{1-2}$alkyl; $C_{1-2}$alkoxy; cyano; formamido; ($C_{1-4}$alkyl)carbonylamino; ($C_{1-4}$alkyl)carbonylamino the $C_{1-4}$ alkyl moiety of which is monosubstituted by chloro, bromo, $C_{1-4}$alkoxy, phenyl or phenoxy; benzamido; ($C_{2-4}$-alkenyl)carbonylamino; aminocarbonylamino; ($C_{1-4}$alkyl)aminocarbonylamino; ($C_{1-4}$alkoxy)carbonylamino; ($C_{1-4}$alkoxy)carbonylamino the $C_{1-4}$alkoxy moiety of which is monosubstituted by $C_{1-4}$alkoxy or phenyl; $C_{1-2}$alkylsulfonylamino; phenylsulfonylamino; di-$C_{1-2}$alkylaminosulfonylamino; chloro; bromo or phenoxy, with the proviso that $R_5$ is other than chloro, bromo or phenoxy when $R_4$ is chloro, bromo or phenoxy.

10. A process according to claim 9 wherein said dehydrating agent is an inorganic acid halide, a dehydrating acid or an acid anhydride.

11. A process according to claim 10 wherein said dehydrating agent is a phosphorus oxyhalide, a phosphorus trihalide, a phosphorus pentahalide, thionyl chloride, polyphosphoric acid, sulfuric acid, p-toluenesulfonic acid or chlorosulfonyl isocyanate.

12. A process according to claim 11 wherein said dehydrating agent is phosphorus oxychloride.

13. A process according to claim 12 wherein the reaction is conducted at a temperature of 20°–100° C. in an inert organic solvent in which the compound of the formula

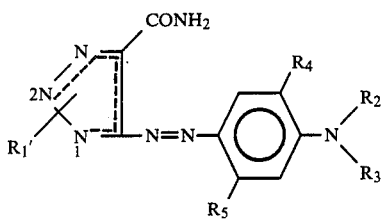

is at least partially soluble.

14. A process according to claim 13 wherein $R_1$ is in the 1-position of the triazole ring and the broken line represents double bonds in the 2,3- and 4,5-positions, and each of $R_2$ and $R_3$ is independently acetoxyethyl, allyloxyethyl, prop-2-ynyloxyethyl, 2-acetoxypropyl, allyl, 2-methylallyl or benzyloxyethyl.

15. A process according to claim 13 wherein the reaction is conducted at a temperature of 40°–60° C.

16. A process for the synthesis of a compound of the formula

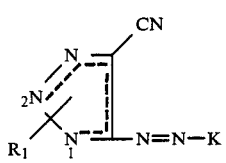

comprising diazotizing a compound of the formula

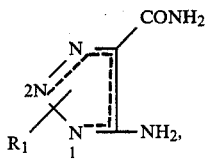

coupling the resulting diazonium compound with a compound of the formula H-K to form an azo compound of the formula

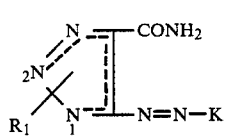

and treating said azo compound with a dehydrating agent to obtain a compound of the formula

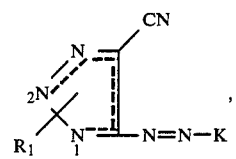

said dehydrating agent being an agent capable of dehydrating a compound of the formula

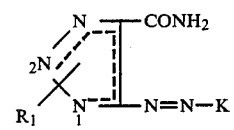

to a compound of the formula

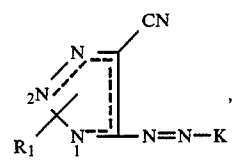

wherein $R_1$ is hydrogen; $C_{1-4}$alkyl; $C_{1-4}$alkyl monosubstituted by fluoro, chloro, bromo, ($C_{1-4}$alkyl)carbonyl, $C_{1-4}$alkoxy, cyano, thiocyano, phenoxy, ($C_{1-4}$-alkoxy)-carbonyl, phenoxycarbonyl, ($C_{1-4}$alkoxy)-ethoxycarbonyl, ($C_{1-4}$ alkyl)carbamoyl, di-($C_{1-4}$-alkyl)carbamoyl, phenylcarbamoyl, N-$C_{1-4}$alkyl-N-phenylcarbamoyl, benzoyl, ($C_{1-4}$alkyl)carbonyloxy, phenylsulfonyl, $C_{1-4}$alkylsulfonyl, sulfamoyl, $C_{1-4}$alkylsulfamoyl, di-($C_{1-4}$alkyl)sulfamoyl, phenylsulfamoyl, N-$C_{1-4}$alkyl-N-phenylsulfamoyl, phenyl or substituted phenyl having 1 or 2 substituents each of which is independently chloro, bromo, nitro, cyano, trifluoromethyl, $C_{1-4}$alkyl or $C_{1-4}$alkoxy; $C_{2-4}$alkenyl; $C_{2-4}$alkenyl monosubstituted by chloro, bromo or phenyl; $C_{2-4}$alkynyl; phenyl or substituted phenyl having 1 to 3 substituents each of which is independently $C_{1-4}$alkyl, $C_{1-4}$alkoxy, chloro, bromo, nitro, cyano (maximum of two), trifluoromethyl (maximum of two), ($C_{1-4}$alkoxy)carbonyl (maximum of two), formyl (maximum of one), ($C_{1-4}$-alkyl)carbonyl (maximum of one), ($C_{1-4}$alkyl)carbamoyl (maximum of one), di-($C_{1-4}$alkyl)carbamoyl (maximum of one), $C_{1-4}$alkysulfonyl (maximum of one), phenylsulfonyl (maximum of one), sulfamoyl (maximum of one), $C_{1-4}$-alkylsulfamoyl (maximum of one), di-($C_{1-4}$alkyl)sulfamoyl (maximum of one) or phenylsulfamoyl (maximum of one), with the proviso that $R_1$ is in the 1-position of the triazole ring and the broken line represents double bonds in the 2,3- and 4,5-positions or $R_1$ is in the 2-position of the triazole ring and the broken line represents double bonds in the 3,4- and 1,5-positions, and K is a coupling component radical.

17. A process according to claim 16 wherein

K is 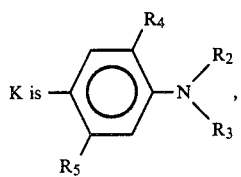

wherein each of

R₂ and R₃ is independently hydrogen; $C_{1-8}$alkyl; $C_{1-8}$alkyl monosubstituted by chloro, bromo, cyano, thiocyano, ($C_{1-4}$-alkyl)carbonyl, ($C_{1-4}$alkoxy)carbonyl, formyloxy, ($C_{1-4}$alkyl)carbonyloxy, ($C_{1-4}$chloroalkyl)carbonyloxy, ($C_{1-4}$-bromoalkyl)carbonyloxy, ($C_{1-4}$alkoxy)carbonyloxy, ($C_{1-4}$alkoxy)($C_{1-4}$alkoxy)carbonyl, allyloxycarbonyl, chloroallyloxycarbonyl, bromoallyloxycarbonyl, $C_{2-4}$alkenyloxy, $C_{2-4}$chloroalkenyloxy, $C_{2-4}$bromoalkenyloxy, $C_{2-4}$alkynyloxy, benzoyloxy, $C_{1-4}$alkoxy, phenyl, phenoxy, phenyl($C_{1-4}$alkoxy), ($C_{1-4}$alkyl)carbamoyl, di-($C_{1-4}$alkyl)carbamoyl, ($C_{1-4}$alkyl)carbamoyloxy, di-($C_{1-4}$alkyl)carbamoyloxy, phenylcarbamoyl, phenylcarbamoyloxy, phthalimidyl, saccharinyl-2, pyridyl or benzothiazolyl-2-mercapto; ($C_{1-4}$alkoxy)$C_{1-4}$alkyl the $C_{1-4}$alkoxy moiety of which is monosubstituted by chloro, bromo, cyano, $C_{1-4}$alkoxy, ($C_{1-4}$alkoxy)carbonyl, ($C_{1-4}$alkoxy)carbonyloxy or ($C_{1-4}$alkyl)carbonyloxy; 2-($C_{1-4}$alkyl)carbonyloxy-3-propynyloxypropyl; 2-($C_{1-4}$alkyl)carbonyloxy-3-allyloxypropyl; $C_{2-4}$alkenyl; $C_{2-4}$alkenyl monosubstituted by phenyl, chloro or bromo; $C_{2-4}$alkynyl; $C_{5-7}$cycloalkyl; $C_{5-7}$cycloalkyl substituted by 1 to 3 methyl groups; phenyl or substituted phenyl having 1 to 3 substituents each of which is independently chloro, bromo, methyl or $C_{1-2}$alkoxy, with the provisos that at least one of R₂ and R₃ is other than $C_{5-7}$cycloalkyl, $C_{5-7}$cycloalkyl substituted by 1 to 3 methyl groups, phenyl or substituted phenyl and that at least one of R₂ and R₃ is other than hydrogen, R₄ is hydrogen, chloro, bromo, $C_{1-2}$alkyl, $C_{1-2}$alkoxy or phenoxy, and R₅ is hydrogen; $C_{1-2}$alkyl; $C_{1-2}$alkoxy; cyano; formamido; ($C_{1-4}$alkyl)carbonylamino; ($C_{1-4}$alkyl)carbonylamino the $C_{1-4}$alkyl moiety of which is monosubstituted by chloro, bromo, $C_{1-4}$alkoxy, phenyl or phenoxy; benzamido; ($C_{2-4}$-alkenyl)carbonylamino; aminocarbonylamino; ($C_{1-4}$alkyl)aminocarbonylamino; ($C_{1-4}$alkoxy)carbonylamino; ($C_{1-4}$alkoxy)carbonylamino the $C_{1-4}$alkoxy moiety of which is monosubstituted by $C_{1-4}$alkoxy or phenyl; $C_{1-2}$alkylsulfonylamino; phenylsulfonylamino; di-$C_{1-2}$alkylaminosulfonylamino; chloro; bromo or phenoxy, with he proviso that R₅ is other than chloro, bromo or phenoxy when R₄ is chloro, bromo or phenoxy.

18. A process according to claim 17 wherein said dehydrating agent is a phosphorus oxyhalide, a phosphorus trihalide, a phosphorus pentahalide, thionyl chloride, polyphosphoric acid, sulfuric acid, p-toluenesulfonic acid or chlorosulfonyl isocyanate.

19. A process according to claim 18 wherein said dehydrating agent is phosphorus oxychloride, and the reaction of said azo compound of the formula

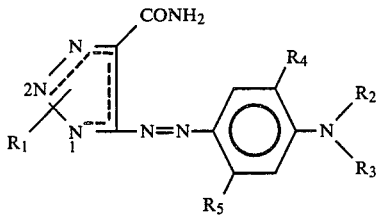

is conducted at a temperature of 20°–100° C. in an inert organic solvent in which said azo compound is at least partialy soluble.

20. A process according to claim 19 wherein

R₁ is in the 1-position of the triazole ring and the broken line represents double bonds in the 2,3- and 4,5-positions, and each of R₂ and R₃ is independently acetoxyethyl, allyloxyethyl, prop-2-ynyloxyethyl, 2-acetoxypropyl, allyl, 2-methylallyl or benzyloxyethyl.

* * * * *